Oct. 10, 1944. L. A. HUBERT 2,359,914
MILKING MACHINE
Filed April 8, 1940

INVENTOR.
LOUIS A. HUBERT.
BY Thomas G. Boman.
ATTORNEY

Patented Oct. 10, 1944

2,359,914

UNITED STATES PATENT OFFICE 2,359,914

MILKING MACHINE

Louis A. Hubert, Sparta, Mich.

Application April 8, 1940, Serial No. 328,489

3 Claims. (Cl. 31—62)

My invention relates generally to milking apparatus and more particularly to a milking machine wherein the process of milking and its appurtenant operations may be expediently accomplished.

One difficulty of present day machines of this character is that the pail or milk container is extremely difficult to handle during the emptying operation inasmuch as the cover of the pail carries not only the air hoses but also the entire teat cup assembly. Thus the cover assembly is cumbersome and requires the full use of one of the operator's hands during the emptying operation. This leaves only the remaining hand for lifting and tilting the pail with its heavy load of milk and this has been found to often overtax the strength of the tilter.

One of the main advantages obtained by my unit lies in mounting of the teat cup assemblies, when not in use, upon the pail itself. Thus the cover of the pail is very materially lightened whereby it may be lifted and handled by one or two fingers of the operator. And, due to the elimination of the bulkiness of the teat cup assemblies, the cover may be moved to close proximity to the main handle or pail handle, this manipulation being desirable during the emptying of the pail.

And, additionally, along this same line, the handle is rigidly attached onto the pail whereby the knee of the operator or milker may be expediently used during the tilting or emptying operation.

Another feature of my invention lies in the entry of the milk through the top edge of the pail proper whereby milk does not contact the cover and consequently its cleansing is facilitated.

In other words, prior art shows valves on the cover, fresh milk passing therethrough, and this necessitates a thorough washing operation for the entire cover, which, in turn, requires a detachable connection for the pulsator since this unit must be kept moisture free. In applicant's construction only the underside of the cover needs to be washed. Thus the cover does not need to be inverted during the washing operation. And, it will be appreciated, even though the valves of prior art be eliminated, that, nevertheless, the holes through the cover would need to be cleaned by the same manner of movement, with the result that the pulsator must needs be made readily detachable.

Another feature of applicant's invention is omitting the milk entry through the cover and substituting the side entry, thus giving a more direct and less restricted flow of milk. And, due to the horizontal positioning of the terminal milk entry pipes, the hose itself may be transformed into an automatically closable valve.

Also, it is to be fully appreciated, that, as above noted, the pulsator may be permanently attached onto the cover and thus time and trouble are saved during the daily washings.

Another advantage is that my assemblage may be expediently turned sidewise by its rigid handle during its passage between the cows. Also, this rigid handle may be used to carry the full or empty container regardless of whether the cover is on or off.

Other objects, advantages and meritorious qualities reside in the special construction, combination and arrangement of the various elements forming the invention, as more fully hereinafter described and claimed, reference being had to the accompanying drawing forming part hereof, wherein:

Like numerals refer to like parts throughout the several views.

Figures 1, 2, 3, 4, 5, 6, 7, 8, 9:
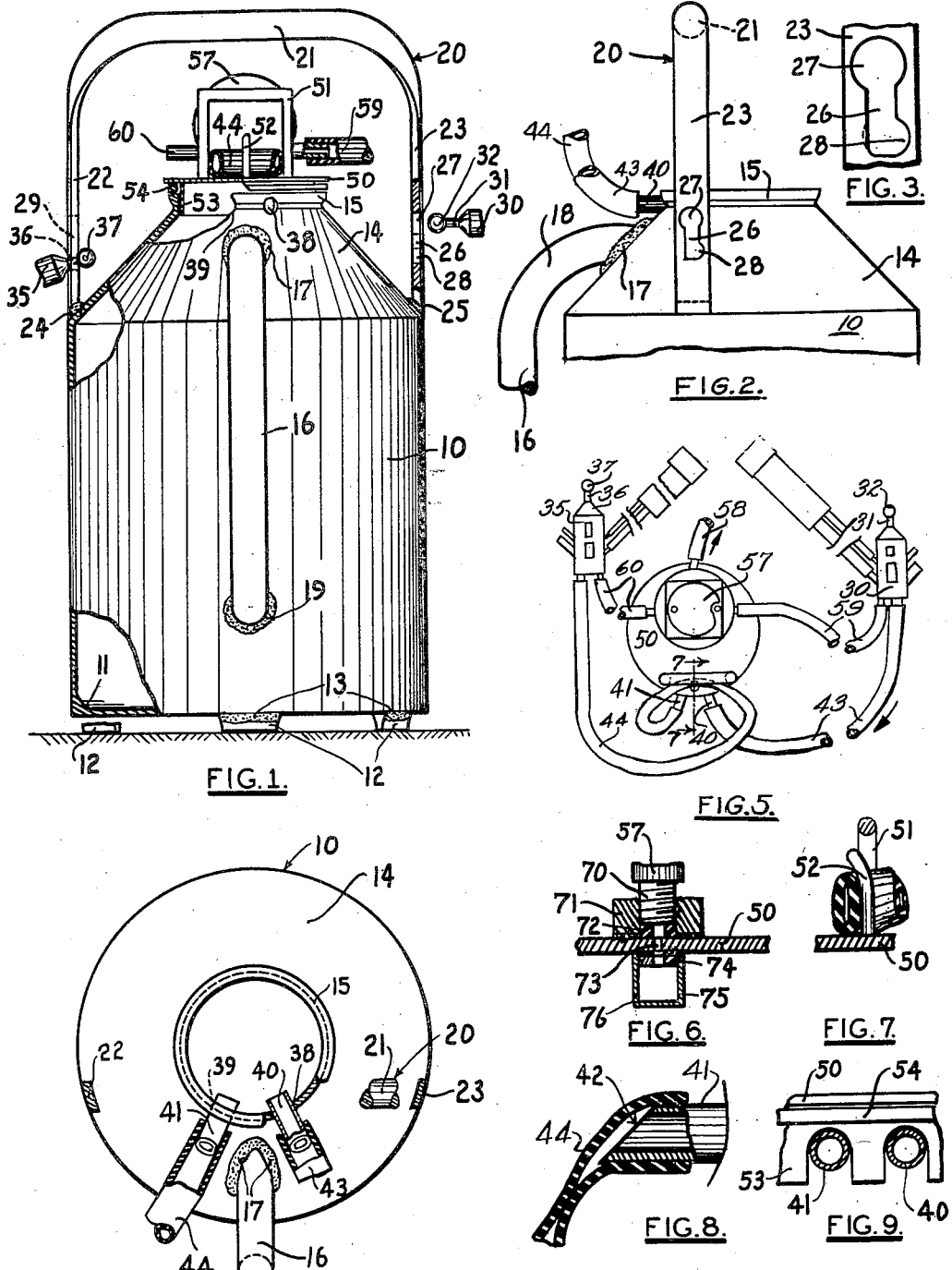
Fig. 1 is a side view of my improved apparatus, parts being broken away in order to expedite the showing.
Fig. 2 is a fragmentary view taken at right angles to Fig. 1, certain parts being omitted.
Fig. 3 is an enlarged fragmentary view of one of the slots through the rigid handle.
Fig. 4 is a plan view of Fig. 1, certain parts being broken away or omitted.
Fig. 5 is a diagrammatic plan showing the relationship of the several units.
Fig. 6 is a cross sectional view showing the details of the connection of the pulsator onto the cover.
Fig. 7 is a fragmentary sectional view taken along the plane of the line 7—7 of Fig. 5.
Fig. 8 is an enlarged partially sectional view of a milk intake nipple and part of a milk hose.
Fig. 9 is a fragmentary view showing the cover with the inlet ducts therethrough.

Referring to Figs. 1, 2 and 3, numeral 10 indicates the milk container or pail, this unit preferably being formed of aluminum. As shown in Fig. 1, the inside inner corner is rounded as at 11. The bottom of the pail carries three equidistantly spaced legs or knobs 12, these being suitably attached onto the lower part of the pail as by brazing as at 13. Thus a stable and solid support is formed for the pail and its appurtenances.

The upper part of the pail is converged as indicated at 14 and then merged into an opening interiorly of the rim 15. This hole or opening is of sufficient size to permit the milker, even with his overcoat on, to insert his arm therethrough to the shoulder. Thus cleansing is facilitated.

A handle 16 is attached onto the upper part of the milk pail as at 17, particularly see Fig. 2, then curved outwardly and downwardly at 18 into the main vertical portion of the handle. This curved portion 18 permits the milker to grasp the same during the emptying operation of the container, the hand being slid more or less, in either direction, during this operation. The handle 16 is turned inwardly towards the container at its lower end and may be attached thereto as at 19, see Fig. 1. Thus a rigid handle is provided. And this handle is parallel to the longitudinal axis of the pail and serves admirably during the emptying of the heavily loaded pail. Also, if desired, the pail itself may be transported by this handle.

Another handle 20 is also provided for the container. This handle may be formed of strip material with its central portion curved to cylindrical cross section as at 21 and its right angled end portions 22 and 23 retaining their flat shape. The handle is of an inverted U-shape, the lower end of the portion 22 being attached by brazing at 24 onto the container and the other portion 23 being attached at 25 onto the container. Thus the handle or bail is rigidly attached onto the container. Thus it may be used to tilt the pail, as desired, and also to transport the pail either empty or loaded regardless of whether or not a vacuum is had in the pail. It will be noted that the handle 20 is attached away from a central plane of the container, this offset positioning giving better and freer access into the inside of the container or pail. This lateral attachment is clearly shown in Fig. 2 of the drawing.

As shown in Figs. 2 and 3, the end portion 23 of the handle 20 has a slot 26 with its upper end enlarged at 27 as shown and its lower end laterally widened as at 28. The opposite end portion 22 is similarly slotted as indicated generally at 29, the lower widened portion of the slot 29 extending in the same direction as the widened portion 28 of the slot 26.

The slots 26 and 29 are adapted to receive and carry or support the teat cup assemblies, there being two assemblies in the instant disclosure, each equipped with a holding means. As shown, numeral 30 indicates a body portion, which may carry a teat cup assembly to which an air hose and a milk hose lead, this body having a stem 31 and a ball 32 thereon.

As shown at the right hand side of Fig. 1, the ball 32 is of such diameter as to be passed through the enlarged portion of the slot 26, that is, the portion designated 27, and then downward movement causes it to be locked therewithin. The weight of the teat cup assembly is carried by this attachment. During the tilting of the container, as when emptying the same, the stem 31 slides over into or around into the cut away portion 28 and thus there is no danger that the teat cup assembly will become disengaged and drop onto the floor. And, the inner side of the slot opposite the cut away part 28 may be slightly cutaway as indicated by the dotted lines of Fig. 3. This provides an additional seat for the stem 31.

Similarly, the other teat cup assembly has a body 35 with a reduced stem 36 and a ball 37. This construction is locked into and carried by the other slot 29 as just described with reference to the slot 26. The disclosure at the left hand upper side of Fig. 1 shows the body 35 of the teat cup assembly in its supported position.

Preferably, the slots 26 and 29 are below the top of the pail, this construction maintaining the teat cup assemblies, carried in these slots, out of the way at all times, especially during the pouring of the milk from the pail.

As shown in Fig. 1, holes 38 and 39 are formed through the container near the top thereof. These holes have, as shown in Figs. 4 and 5, the milk inlet pipes 40 and 41, respectively, sealed thereinto. The outer ends of these pipes are cut off at an angle as indicated at 42, see Fig. 8, and thus the milk hose, which extends therefrom, when moved downwardly, cuts off any return flow of air and thus provides a seal. Thus a single side of the double unit may be expediently used.

The pipe 40 has a milk hose 43 attached thereto and the pipe 41 has a similar hose 44 thereonto. As indicated in Fig. 5, the hose 43 is shown leading to the body member 30, this body member being previously referred to as carrying the teat cup assembly. The other hose 44 has been moved by means of its bight so that it assumes the position shown in Fig. 8 and thus air is prevented from returning therethrough. And, additionally, the hose 44 has been further sealed by another means, now to be described.

The rim 15 of the container receives a cover or lid 50 with a U-shaped handle 51, a pin 52 being attached to extend upwardly between the ends of the handle 51. The handle 51 is rigidly attached onto the top of the cover in any suitable manner. The positioning of these several parts is shown in Figs. 1, 5 and 7, and it will be readily understood that the bight of the hose 44, when looped around the pin 52, as shown, will collapse and close the same and thus air and milk movement through the hose will be prevented.

The cover 50 has a downwardly extending flange 53 fitting within the rim 15. See Fig. 1. A soft rubber gasket 54 is located between the top of the rim and the cover and provides an air-tight seal for the pail when a vacuum is produced therein.

The flange 53 is slotted upwardly to receive the pipes 40 and 41, these extending inwardly beyond the flange as shown in Fig. 4. See Fig. 9. The entry of the pipes into the slots of the flange prevents rotation of cover.

Referring to Figs. 1 and 5, numeral 57 indicates the pulsator, a duct 58 leading to the air pump (not shown) whereby a vacuum may be had within the pulsator. The pulsator is also provided with the air ducts 59 and 60 leading to the body members 30 and 35, previously referred to, but inasmuch as these are more or less incidental to the invention they will not be set forth in detail.

The pulsator 57, see Fig. 6, has a threaded lower stem 70 which threads into the nut 71, rigid with the cover 50, and a rubber gasket 72, between these elements as shown, provides for a tight seal. A small opening 73 is bored through the cover as shown, and an annular member 74, rigid with the underside of the cover, is exteriorly threaded to receive the shielding thimble 75. The thimble 75 has a small opening 76 to permit air passage therethrough. It is of prime importance that the small opening 76 be faced away from the incoming milk pipes 40 and 41 so that no liquid will be splashed thereinto. Also, the location of the small opening 76 is such as to permit any liquid to readily drain from the thimble.

From the above description, it will be understood that the several previously recited advantages will follow the use of my invention, as well as others which will be understood by those skilled in this art, and reference is again made thereto.

Having thus revealed this invention, I claim as new and desire to secure the following combinations and elements, or equivalents thereof, by Letters Patent of the United States:

1. In a milking machine of the class described, the combination of, a pail, a cover therefor, means for preventing rotation between the cover and the pail, an opening through the pail near the top thereof, a pipe in said opening, a teat cup assembly including a milk line and an air line, a supporting stem terminating in a ball rigid with the said teat cup assembly, said pail having means for tilting the same extending vertically along one side thereof, a handle of inverted U-shape welded onto the pail at a point or points materially below the top of the pail, said handle having a slot therein below the top of the pail for receiving the said ball to thereby support the said teat cup assembly, a pulsator rigidly attached onto the said cover, the air line leading thereto and the milk line being attached onto the said pipe, and means for preventing liquid entry into the said pulsator.

2. In a milking apparatus of the class described, a milk pail having its upper end open, a cover therefor, a pulsator attached to said cover, an elongated member rigidly attached onto the pail and extending upwardly therefrom and then laterally to a position over the pail and in spaced relation thereto, said elongated member having a keyhole slot therein, the larger portion of the said slot being uppermost, a teat cup assembly including a milk line, an air line and a supporting extension with an enlarged terminal, said terminal being receivable through the larger part of the said keyhole slot whereby the extension slides downwardly therein to maintain the teat cup assembly in associated and supported relation with the elongated member, a handle on the milk pail for tipping the same, means for connecting the milk line of the assembly so as to lead directly into the said pail adjacent the said handle whereby the milk line depends and extends between the teat cup assembly and the pail and does not interfere in any manner with the emptying operation, and means for connecting the air line onto the said pulsator for the purpose described.

3. In a milking device of the class described, comprising, a pail, a bail rigid therewith and extending thereover, a teat cup assembly having a milk hose attached onto the pail, at a point approximately at right angles to the bail, an air hose, and a milking claw, means for detachably fastening the claw onto the bail whereby rotative or oscillative movement, within limits, is permitted therebetween, this action occurring when the pail is tilted as during the emptying operation, and a cover with a pulsator for the pail, said air hose leading to the pulsator.

LOUIS A. HUBERT.